United States Patent [19]

Le Goffic et al.

[11] Patent Number: 4,827,474
[45] Date of Patent: May 2, 1989

[54] SYSTEM AND METHOD OF ADJUSTING THE INTERSTATION DELAY IN AN INFORMATION TRANSMISSION SYSTEM

[75] Inventors: Yves H. M. Le Goffic, Lannion; René Tanguy, Plestin les Greves, both of France

[73] Assignee: Telecommunications Radioelectriques et Telephoniques T.R.T., Paris, France

[21] Appl. No.: 133,701

[22] Filed: Dec. 16, 1987

[30] Foreign Application Priority Data

Dec. 19, 1986 [FR] France .................. 86 17862

[51] Int. Cl.$^4$ ............................................. H04J 3/06
[52] U.S. Cl. .................................................. 370/104
[58] Field of Search .......................... 370/100, 104, 95

[56] References Cited

U.S. PATENT DOCUMENTS

| | | | |
|---|---|---|---|
| 4,472,802 | 9/1984 | Pin et al. | 370/104 |
| 4,642,806 | 2/1987 | Hewitt et al. | 370/104 |
| 4,686,672 | 8/1987 | Namiki | 370/104 |
| 4,688,216 | 8/1987 | Saburi | 370/104 |

Primary Examiner—Benedict V. Safourek
Assistant Examiner—Frank M. Scutch, III
Attorney, Agent, or Firm—Thomas A. Briody; Jack E. Haken; Anne E. Barschall

[57] ABSTRACT

Method of adjusting the interstation delay in an information transmission system comprising a large number of relay stations arranged in cascade and utilizing in one transmission direction the TDMA method, and a system to which such a delay adjusting method is applied.

This method of adjusting the interstation delay in an information transmission system utilizing the TDMA principle can be advantageously used when the system comprises a large number of relay stations in a cascade arrangement. An adjusting range is imposed on the delay to be allocated to the transmission of data in order to avoid information jumps which may provoke overlapping on reception of these data. The adjustment of the delay is effected by starting with the relay station nearest to the central station, then the following relay station etc., and ending with the adjustment of the terminal station involved.

6 Claims, 7 Drawing Sheets

SYSTEM AND METHOD OF ADJUSTING THE INTERSTATION DELAY IN AN INFORMATION TRANSMISSION SYSTEM

BACKGROUND OF THE INVENTION

1. Field of the Invention

The present invention relates to a method of adjusting the interstation delay in an information transmission system utilizing in one transmission direction the TDMA method (Time Division Multiple Access), the transmission system being constituted by a network comprising a central station and a plurality of sub-stations which includes relay sub-stations arranged in cascade, the sub-stations comprising time-shifting means for shifting the instants of transmitting the information bits to the central station, the central station comprising time-detecting means for detecting the order in which the said information bits arrive, each station in the network comprising at least a transmit time-base and a receive time-base.

2. Prior Art

A method of adjusting the interstation delay in such an information transmission system is described in the French Patent Specification No. 2,502,426 (corresponding with U.S. Pat. No. 4,472,802). In the information transmission system, the information signals are transmitted in accordance with the TDMA method in the transmission direction from the sub-station to the central station. A sub-station only transmits when a time slot has been assigned thereto and in this time slot just one single station is authorized to transmit. All sub-stations operate in synchronism with the central station and solving the problems as regards synchronization is essential to avoid, on reception at the central station, the overlapping of information signals originating from different sub-stations. To solve these synchronization problems the sub-stations comprise means for shifting the instants of transmitting the bits of their information signals, and the central station comprises means to detect whether the information bits arrive properly located the time.

In this manner the problems of synchronization are solved, but when a terminal sub-station at a subscriber is very remote from the central station, there is still one problem left to be solved, for it is then necessary to insert a large number of relay sub-stations in a cascade arrangement, relay sub-stations which also themselves can naturally be connected to terminal sub-stations at subscribers. Each relay sub-station has to recover the clock from the information bit stream coming from the central station and utilize this clock to retransmit in its turn, which in the case of a considerable number of relay sub-stations can produce phase-shifts leading to jumps of several bit periods. Actually, the reception of the bits of the information signals coming from the sub-stations situated further away takes place with the aid of recovering the clock from the received information bit stream, and the phase of this recovered clock with respect to that of the sub-station can have any value, for it is a function of the interstation distance and can change under the influence of specific phenomena such as temperature variations. If, in an initial configuration, the two clocks are substantially in-phase, a slight phase variation can translate into a shift over one bit period, and when many relay stations are connected in cascade, the shift can amount to many bit periods.

SUMMARY OF THE INVENTION

The present invention proposes a method which, when applied to the means described in the preamble, allows to avoid the aforementioned problem and provides for a precision that is better than one bit period.

According to the invention, the method is applied to the cooperating time-shifting and time-detecting means in order to adjust the delay to be allocated to the transmit time-bases of the various sub-stations, the method comprising, at the central station, effecting the initial adjustment of the delay for each sub-station to a bit period and, at the substation, increasing the delay in steps of $1/(2n-1)$ bit period until a jump of 1 bit period is obtained, and then decreasing the delay by n steps of the same size for the optimum adjustment of the interstation delay, where n is an integer strictly greater than 1. This manner of adjustment avoids occasional jumps of 1 bit period during the transit through relay sub-stations, as long as the jitter of the received signal is less than $\pm(n-1)/(2n-1)$ bit period. In fact, owing to this method, it is certain that the clock phase of central station and sub-station are not adjacent because a shift of $n/(2n-1)$ bit period is imposed, which permits a variation amounting to $\pm(n-1)/(2n-1)$ bit period without provoking a jump in the information stream.

On the other hand, when the method of adjusting the interstation delay is employed for adjusting the delay of a terminal sub-station exchanging information with the central station through a cascade arrangement of relay sub-stations, the said method is sequentially applied in a predetermined order to said time-shifting means of the various sub-stations in the cascade arrangement cooperating with said time-detecting means of the central station, commencing in said order with the relay sub-station nearest to the central station then the relay sub-station immediately following etc., and ending with the terminal sub-station involved. The verification of the adjustment of a sub-station is thus effected in the central station where the measuring is always realized with a precision of one bit period. The indications of the delay of a sub-station take account of its distance and the transit time required to pass through various relay sub-stations, whereas at the sub-stations the shift is imposed with a precision of $1/(2n-1)$ bit period. As the adjustments are made one after another, it is ensured that the optimum adjustment of the sub-station is effected without a risk of jumps in the information stream and irrespective of the number of relay sub-stations inserted between the central station and the relevant terminal sub-station.

BRIEF DESCRIPTION OF THE DRAWING

The following description given by way of example with reference to the accompanying drawings will make it better understood how the invention can be put into effect. In the drawings.

DETAILED DESCRIPTION OF THE PREFERRED EMBODIMENTS

Figure 1:
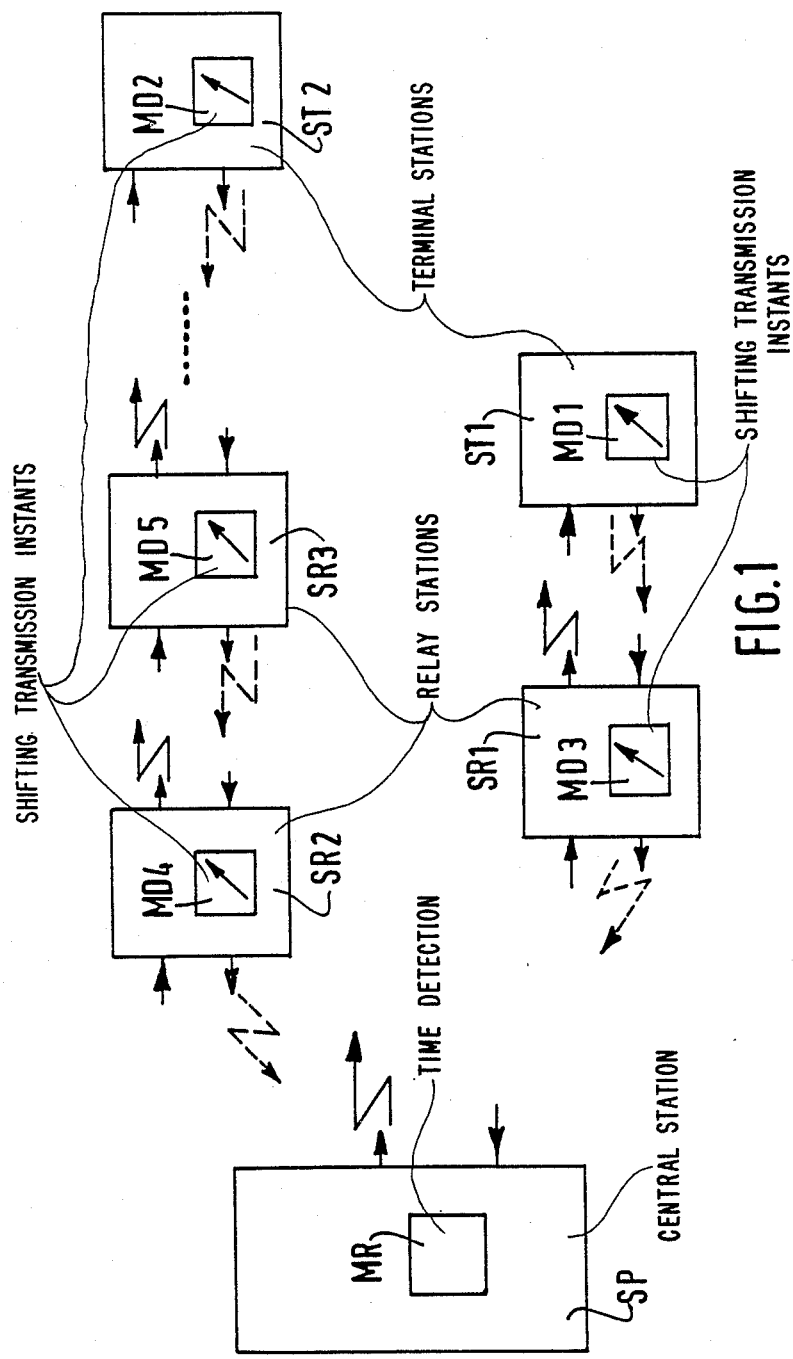
FIG. 1 shows a basic structure of an information transmission system to which the method according to the invention is applied.

In FIG. 1 is shown a basic configuration of an information transmission system to which the method according to the invention is applied. For connecting telephone subscribers situated in vast sparsely populated areas, it is advantageous to utilize telephone concentrators. In such a system for radio transmission of information in a configuration of the point-to-multipoint type, the network is constituted by a central station SP situated near to the switching exchange and a plurality of sub-stations (terminal stations ST1, ST2, . . . , relay stations SR1, SR2, SR3, . . . ) situated in the subscribers' areas. In fact, the central station can communicate directly with a terminal station, but when there is a large distance between these two stations, it is normal to insert one or even a plurality of relays (as shown in FIG. 1).

The transmission in the direction from the central station to the sub-stations takes place in a broadcasting mode, in which the central station transmits to all sub-stations. Transmission in this direction can thus be effected according to the conventional Time-Division-Multiplex method (TDM), the arrows in a solid line symbolizing this transmission mode in FIG. 1.

In the direction from the sub-stations to the central station the transmission is effected according to the Time-Division-Multiple-Access method (TDMA), this transmission mode being symbolized in FIG. 1 by arrows in broken lines. A sub-station can only transmit information signals during the time-slot which has been assigned thereto and during this time-slot only that station is authorized to transmit. With this method, all sub-stations are synchronized with the central station and this synchronization turns to be a fundamental problem to be solved. In fact, the sub-stations have to transmit their information signals such that these signals are not overlapping on arrival at the central station.

A solution to this problem consists in providing the sub-stations ST1, ST2, . . . SR1, SR2, SR3 . . . , with means MD1, MD2, . . . MD3, MD4, MD5, . . . , respectively, for shifting the transmitting instants and the central station SP with means MR for detecting the order in which the transmitted information signals arrive.

Figure 3:
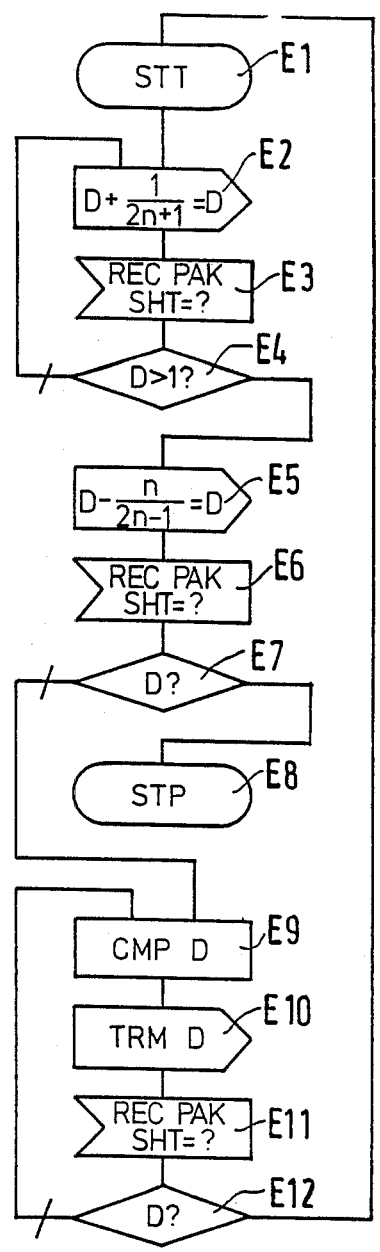
FIG. 3 shows a flow chart of the method of adjusting the delay between stations in accordance with the invention.

According to the method which is represented in FIG. 3, the central station periodically observes the position of the information signals transmitted by the different sub-stations, measures the delay on arrival of the said information signals and returns to the sub-stations indications which permit them to readjust this delay correctly, taking account of the transit time required for passing through the relay station(s).

Figure 2:
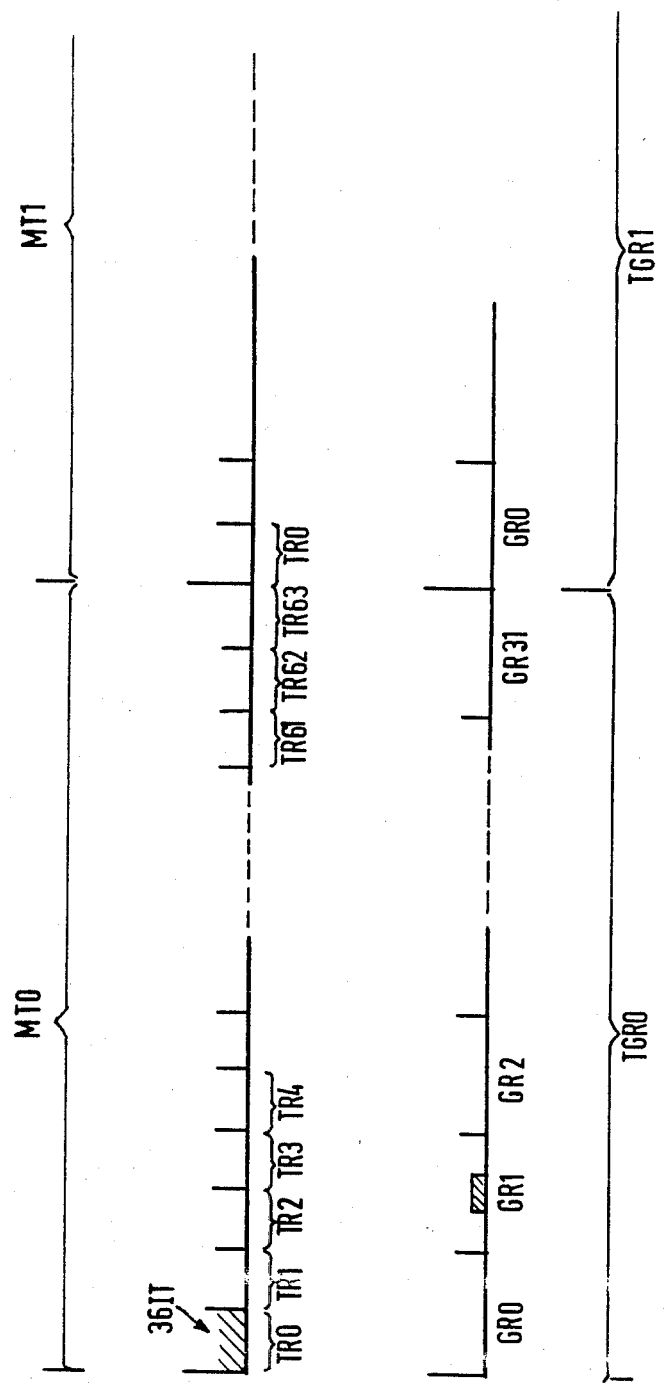
FIG. 2 shows an example of the organization of the transmission frames.

FIG. 2 shows an embodiment of the organization of the transmission frames for a better understanding of the subject matter of the invention.

The transmission of information signals in the direction from the central station to the sub-stations is effected according to a multiplex method that may be organized in the following manner:

a frame TR is composed of 36 time intervals referenced IT0 to IT35, each time interval conveying an byte;

a multiframe MT is composed of 64 frames referenced TR0 to TR63; and a super multiframe SMT is composed of 128 multiframes (in case 128 stations are operating), the multiframes being referenced MT0 to MT127.

Each time interval is used for conveying channel at a bit rate of 64 kbit/s so the multiplex bit rate is 2.304 Mbit/s.

Each frame conveys 30 information channels in the time intervals IT2 to IT32, the time intervals IT32 to IT35 being unused.

The time interval IT0 conveys synchronizing patterns permitting to locate the different time intervals IT within a frame.

The time interval IT1 is used in the following manner:

in the frames of rank $4n+2$ (2, 6, 10, 14 . . . ) it conveys a semaphore channel CS at 16 kbit/s for the dialogue between the central station and the terminal stations; and in the frames of rank $2n+1$ (1, 3, 5, 7 . . . ), it conveys the channel-by-channel signalling V/V with respect to the channel of rank n; and in the frames of rank $4n$ (0, 4, 8, 12, . . . ), it conveys synchronizing patterns S permitting to locate the different frames and multiframes in the super multiframe, and in the multiframe of rank m, it conveys the data channel assigned to the station having the number m.

Thus, in this example, the length of a frame is 125 μs, that of a multiframe 8 ms and that of a super multiframe 1.024 s.

In the direction from the sub-stations to the central station, the transmission of information signals is effected in the time slots referenced GR0 to GR31. Each time slot has a guard time during which there is no transmission and which permits an uncertainty in the time of arrival of the information signals at the central station. In order to diminish the effect of the guard time on the efficiency of the transmission bit rate, each time slot GR contains 72 bytes.

The time slots GR2 to GR31 can be utilized by each one of the sub-stations, provided that the central station has assigned them thereto. Each one of these time slots contains a packet of 72 bytes, constituted in the following manner:

one bytes as guard time during which no transmission takes place;

5 clock bytes permitting to recover the clock on reception;

one bytes as preamble RDP for marking the beginning of the packet proper;

one bytes for channel-by-channel signalling; and 64 information bytes corresponding to 8 ms of packetized speech.

The time slot GR0 is reserved for a semaphore channel at 16 kbit/s which can be seized randomly by each of the sub-stations. This packet is constituted by:

one bytes as guard time during which no transmission takes place;

5 clock bytes for recovering the clock on reception;

one bytes as preamble RDP for marking the beginning of the packet proper;

one bytes that is not utilized;

16 bytes for conveying the semaphore channel;

48 bytes that are not utilized.

The time slot GR1 is successively seized by each of the sub-stations. To this end there are 128 frames referenced TGR0 to TGR127 each having 32 time slots GR.

The transmission is effected at a rate of 2.304 Mbit/s, while one time slot GR lasts 250 µs. Each frame lasts 8 ms and thus the 128 frames last 1.204 s in all.

In FIG. 3 is shown the flow chart of the method of adjusting the interstation delay in an information transmission system in which the TDMA method is utilized in one transmission direction. This transmission system is constituted by a network comprising one central station and a plurality of sub-stations which includes relay sub-stations arranged in cascade, the substations comprising time-shifting means MD for shifting the instants of transmitting the information bits to the central station, the central station comprising time-detecting means MR for detecting the order in which the said information bits arrive, each station in the network comprising at least a transmit time-base and a receive time-base.

Thus, each sub-station comprises means MD for shifting the transmission instants to adjust the delay and permits to shift the transmit time-base of the station with respect to the receive time-base such that the information signals transmitted in the time slots GR arrive at the central station properly located in time.

The central station comprises time-detecting means MR for marking the order in which the information signals arrive and for measuring the transmission delays of the sub-stations. To this end, each sub-station transmits in the middle of the time slot GR1 that is assigned thereto the preamble word RDP. The central station detects the instant of arrival of the preamble word RDP and returns to the sub-station indications which allow it to correctly readjust the delay. To this effect there is provided, in the TDM direction (central station towards sub-stations), a time interval within a multiframe to retransmit the measured length of the delay. In the multiframe of rank m this time interval or data channel is assigned to the station that has the number m.

In accordance with the invention, the method is characterized in that it is applied to the time-shifting means for shifting the instants of transmitting information signals which cooperate with the time-detecting means for detecting the order in which said information signals arrive in order to adjust the delay to be allocated to the transmit time-bases of the various sub-stations, the method comprising, at the central station, effecting the initial adjustment of the delay for each sub-station to a bit period and, at the sub-station, increasing the delay in steps of $1/(2n-1)$ bit period until a jump of 1 bit period is obtained, and then decreasing the delay by n steps of the same size for the optimum adjustment of the interstation delay, where n is an integer strictly greater than 1.

In this manner, the initial adjustment of the delay is effected with a precision of one bit period. Each time slot GR contains, as has been described herein-before, one byte of guard time during which there is no transmission, which allows an adjustment range of $\pm 4$ bits without an overlapping of the packets.

The relay sub-stations inserted between the central station and the terminal sub-stations comprise means MD for shifting their transmission instants, as shown in FIG. 1. They retransmit to the terminal sub-stations the multiplex signal coming from the central station. In the other transmission direction, they retransmit to the central station the different packets received. To this end, the relay sub-station searches for the presence of the preamble word RDP in 8-bit wide time-windows for time slots GR0 and GR2 to GR31 and in a 72 byte wide time-window for the time slot GR1. When the preamble word RDP is detected, the relay sub-station retransmits the corresponding packet shifted by a time required for recognizing this word RDP and for transmitting the five clock byte that precede the word RDP. The packets are retransmitted in the order in which they arrive without being readjusted with respect to the transmit time-base of the relay sub-station.

The verification of the adjustment of a terminal sub-station is effected at the central station. The indicatings concerning the delay of a sub-station take account of its distance and the transit time required for passing through the various relay sub-stations.

According to a characteristic feature of the invention, when the method of adjusting the interstation delay is employed for adjusting the delay of a terminal sub-station exchanging information with the central station through a cascade arrangement of relay sub-stations, the method is sequentially applied in a specific order to the time-shifting means MD of the various sub-stations in the cascade arrangement cooperating with the time-detecting means MR of the central station, commencing in said order with the relay sub-station nearest to the central station, then the relay sub-station immediately following etc., and ending with the terminal sub-station in question.

The adjustment of a sub-station m is effected by utilizing in the multiframe of rank m of the multiplex signal the time interval or data channel intended for said sub-station m. A characteristic feature of the invention consists in transmitting on this data channel the following information signals:

a telecontrol signal prohibiting all transmission from said sub-station m when it is not in operation;

a telecontrol signal allowing only the transmission of a reduced-size packet (5 clock bytes and the preamble word RDP) when the central station proceeds to the adjustment of the delay of said sub-station m, and this in the time slot GR that has been assigned to this sub-station m;

a telecontrol signal allowing the sub-station m to transmit in a normal manner when the delay is adjusted properly.

In the method of adjusting the interstation delay according to the invention described with reference to the flow chart in FIG. 3, state E1 is the initial state [STT] in which the sub-station is adjusted to 1 bit period. In state E2 the delay D at the sub-station is increased by a step of $1/(2n-1)$ bit period $[D+1/(2n-1)=D]$. In state E3, the reduced-size packet is received at the central station [REC PAK] and the shift is measured [SHT=?] with a precision of 1 bit period. In state E4, the question is posed: "Is a 1-bit jump produced?" [D>1?]. If the answer is no, then the next state is again state E2 in which the delay D is increased by another step $1/(2n-1)$ bit period, whereupon the states E3 and E4 follow and this is carried on until the answer to the question posed in state E4 is yes. If the answer in state E4 is yes, then the next state is E5 in which the delay D is decreased by n steps of the same size; thus by $n/(2n-1)$ bit period $[D-n/(2n-1)=D]$. In state E6, the reduced-size packet is received at the central station [REC PAK] and the shift is measured [SHT=?] with a precision of 1 bit period. In state E7, the following question is posed: "Is the delay D correct to 1-bit period" [D?]. If the answer is yes, then the sub-station is declared to be properly adjusted in state E8 [STP]. If, on the other hand, the answer is no, then the next state is E9 in which the calculation of the new delay D is effected [CMP D], where-upon in state E10 the result of the calculation of the new delay D is conveyed [TRM D]. In state E11, the reduced-size packet is received at the central station [REC PAK] and the shift is measured [SHT=?] with a precision of 1-bit period. In state E12, the question is posed anew: "Is the delay D correct to 1-bit period?" [D?"]. If the answer is yes, there is a transition to state E1 and then to the following states as already described hereinbefore, until the sub-station is declared to have been properly adjusted in state E8. If the answer to the question posed in state E12 is no, there will be a return to state E9 for a calculation of the new delay D, then a transition to the following states and this will be carried on until the station is declared to have been properly adjusted.

Thus, according to the method described and by chosing n to be equal to 2 (n must be greater than 1) by way of non-limiting example, the adjustment of the delay is realized in the following manner. The delay is first adjusted to 1-bit period, measuring the delay in a central station being always effected to a precision of 1-bit period. When the measured time of arrival of the reduced-size packets at the central station indicates that the sub-station is properly adjusted to 1 bit period, the transmission from the sub-station to be adjusted is shifted $\frac{1}{3}$ bit period by $\frac{1}{3}$-bit period $(1/(2n-1)=\frac{1}{3})$ until a jump of 1-bit period is obtained (the delay being increased by $\frac{1}{3}$-bit period, then possibly by $\frac{2}{3}$-bit period or 1-bit period). As soon as this jump of 1-bit period is obtained, the delay is reduced by $\frac{2}{3}$-bit period $(n/(2n-1)=\frac{2}{3})$. Under the circumstances, the delay of the sub-station is thus adjusted advantageously and unfailingly in such a manner that the clock of the received data lies in a range separated from the rising edge of the clock of the sub-station by no less than $\pm\frac{1}{3}$-bit period, permitting in this manner a delay variation of $\pm\frac{1}{3}$-bit period without a data shift.

Figure 4:
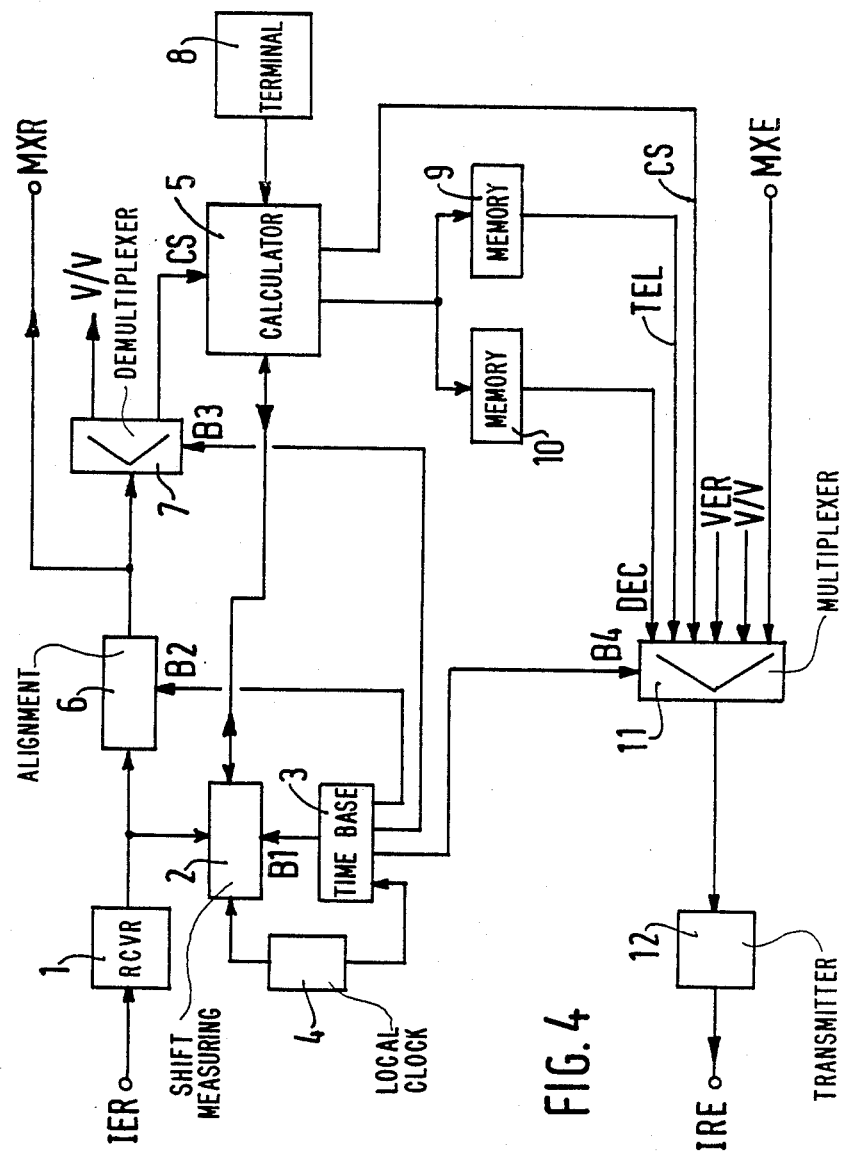
FIG. 4 shows a simplified block diagram of a central station.

FIG. 4 shows the simplified block diagram of a central station.

A receiver 1 receives the information bit streams IER coming from the different sub-stations. A shift measuring circuit 2, controlled by a time-base 3 of the station by means of the signals B1, permits to measure the difference between the time of arrival of a packet in the time slot GR1 and the time at which this packet ought to arrive in theory. The shift measuring circuit is fundamentally constituted by a shift register which shifts the information bit streams at the rate of the recovered far-end clock, a decoder which searches for the presence of the preamble octet RDP marking the beginning of the packet RDP and a bit counter which counts the number of bits of the shift between the actual time of arrival of this preamble octet RDP and its theoretical time of arrival. The shift measuring circuit 2 and the time-base 3 are connected to a circuit 4 which generates the local clock of the station. A calculator 5 has access to the shift measuring circuit 2. The output of the receiver 1 is also connected to an alignment circuit 6, controlled by the time-base 3 by means of the signal B2. The alignment circuit 6, which is known per se and is responsive to the detection of the presence of preamble octets RDP marking the beginning of the packet, permits to supply to a bus MXR the information bit stream properly positioned in the different time slots GR, the bus MXR being intended for the equipment connected to the station.

By means of the signal B3, the time-base 3 controls a demultiplexer 7 whose input is connected to the output of alignment circuit 6, the demultiplexer 7 permitting to extract the channel-by-channel signalling V/V, as well as the semaphore channel CS intended for calculator 5.

The calculator 5 determines the remote-control signals to be sent to the sub-stations, as well as the shift values which they have to apply to their transmit time-base, in response to control signals that are, for example, supplied by an operator with the aid of an exploitation terminal 8 and, on the other hand, shift-information signals received from the shift measuring circuit 2. These remote-control signals and these shift values determined by the counter 5 are stored in the remote-control memory circuit 9 and the shift memory circuit 10, respectively, and are subsequently transmitted on the different data channels. A multiplexer 11, controlled by the time-base 3 by means of the signal B4, permits to supply to a transmitter 12 a multiplex signal IRE which regroups the channel-by-channel signalling V/V, the semaphore channel CS as supplied by the calculator 5, the frame and multiframe alignment signals VER, the information signals MXE sent by the equipment connected to the station, and both the remote-control signals TEL and the shift values DEC elaborated by the calculator 5 and stored in the respective memory circuits 9 and 10. The circuits 2, 5, 9, 10 and the exploitation terminal 8 constitute the time-detecting means for detecting the order in which the information signals arrive, which time-detecting means have been referenced MR in FIG. 1. The adjustment of the sub-stations to a precision of 1 bit period and the verification of their adjustment are effected in the central station.

Figure 5:
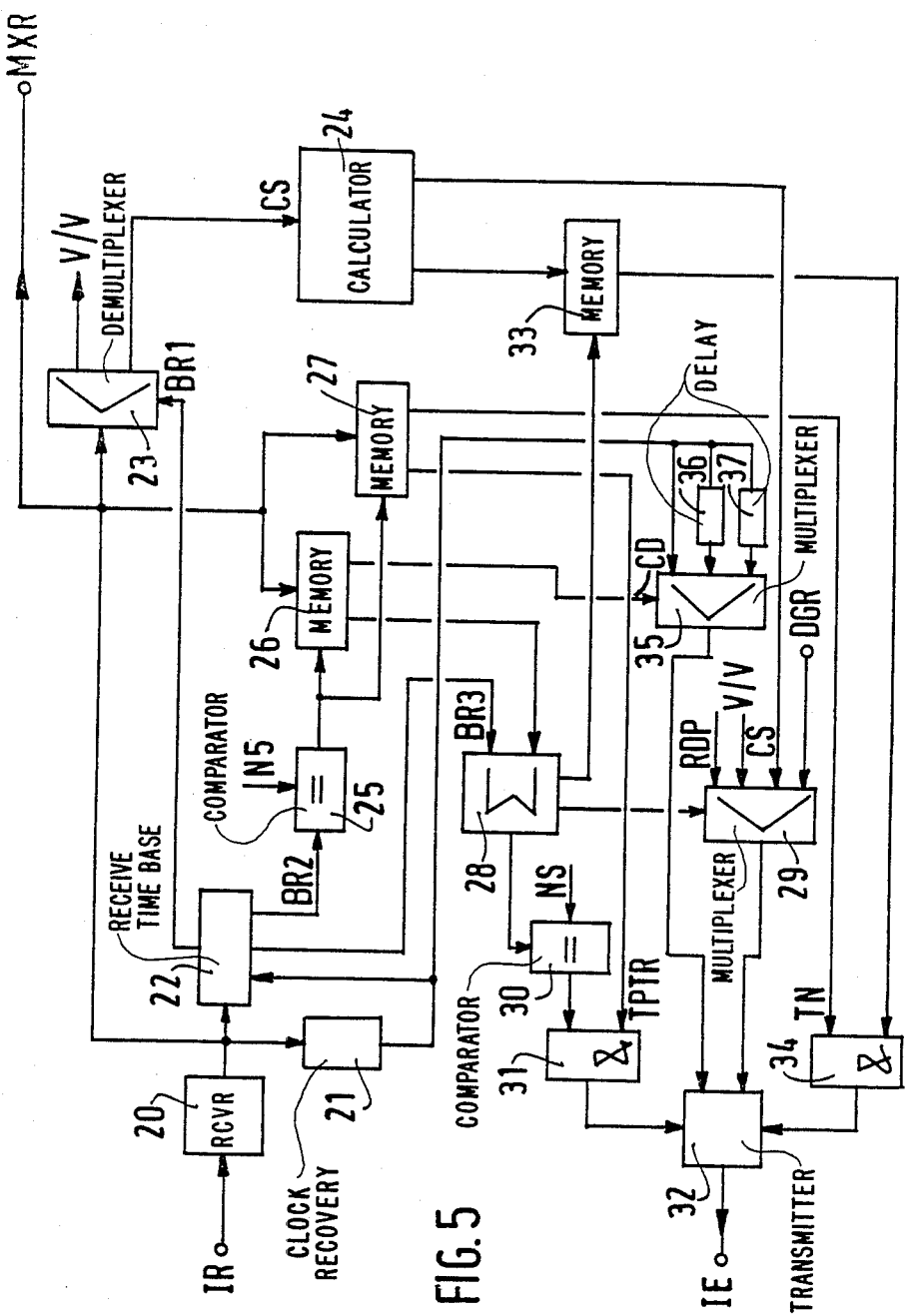
FIG. 5 shows a simplified block diagram of a sub-station.

FIG. 5 shows the simplified block diagram of a sub-station in which the adjustment of the delay is effected to $\frac{1}{3}$-bit period (for n=2).

At the sub-station, the information bit streams IR are received by a receiver 20. With the aid of the information bit stream available at the output of receiver 20 and a clock recovery circuit 21 a receive time-base 22 is controlled. The output information bit stream of the receiver is applied to the input of a demultiplexer 23 which is controlled by the signal BR1 supplied by the time-base 22. The output of the receiver also supplies the information bit stream to a bus MXR. At the output of the demultiplexer the channel-by-channel signalling V/V is extracted, as well as the semaphore channel CS that is routed to a calculator 24. In response to the number NS assigned to the sub-station, a comparator circuit 25 controlled by means of the signal BR2 from the time-base 22 permits to extract the information signals (available at the output of the receiver 20) that relate to the shift and that are stored by a shift memory circuit 26, as well as the information signals (also available at the receiver output) that relate to the remote-control and that are stored by a remote-control memory circuit 27. A time-base 28 is utilized for clocking the transmission and this transmit clock is derived from the signal BR3 of the receiver time-base 22, by adding the shift indicated by the central station and stored in memory circuit 26 with the aid of an adder included in the transmit time-base 28. This time-base 28 controls a multiplexer 29 permitting to insert the preamble byte RDP marking the beginning of the packet proper, the channel-by-channel signalling V/V, the semaphore channel CS present at one of the outputs of calculator 24 and the information signals DGR coming from the equipment connected to the station. The instant of transmitting the reduced-size packet in the time slot GR1 is determined by means of a comparator circuit 30 which detects coincidence between number NS assigned to the station and the state of the time-base 28. The transmission of the reduced-size packet is validated by the remote-control signal TPTR permitting the transmission of the reduced-size packet, this validating signal being available at the output of memory circuit 27. The output signal of comparator circuit 30 is then applied to one input of an AND-gate ET31 which, when it receives the validation signal TPTR on its second input permits a transmitter 32 to transmit the reduced-size packet available at the output of the multiplexer 29. The transmission of data in the other time slots GR is controlled by a memory 33, in which the calculator 24 has written the time slots that have been assigned to the station for unloading the traffic.

The data available at the output of the multiplexer 29 are transmitted by the transmitter 32 when the latter is allowed to transmit. The permission to transmit the information bit stream IE is given by the output of an AND-gate ET34 receiving on one input the control signal from the memory 33 and on its other input the remote-control signal TN from the memory circuit 27 permitting normal transmission. In case a remote-control signal is received prohibiting transmission, as a matter of course the station cannot transmit.

The transmission of information signals in the different time slots GR is either effected with the recovered clock from circuit 21, or with this clock but shifted over ⅓ or ⅔ bit period. To this end, a multiplexer 35 is provided permitting to make the choice between these three clocks, the signal from the clock recovery circuit 21 being applied to a first input of the multiplexer 35, to a second input of the multiplexer 35 after being shifted over ⅓-bit period, for example by means of a delay line 36, and to a third input of the multiplexer 35 after being shifted over ⅔-bit period, for example by means of a delay line 37. The multiplexer 35 is controlled by the signal CD available at an output of the shift memory circuit 26, this signal CD being related to the delay information signals transmitted by the central station. The output of the multiplexer 35 is connected to the transmitter 32 permitting this transmitter to transmit the information signals without a shift, with a shift of ⅓-bit period, or with a shift of ⅔-bit period. The circuits 25, 26, 27, 28, 30, 31, 33, 34, 35, 36 and 37 constitute the time-shifting means for shifting the transmission instants, which time-shifting means have been referenced MD in FIG. 1.

Figure 6:
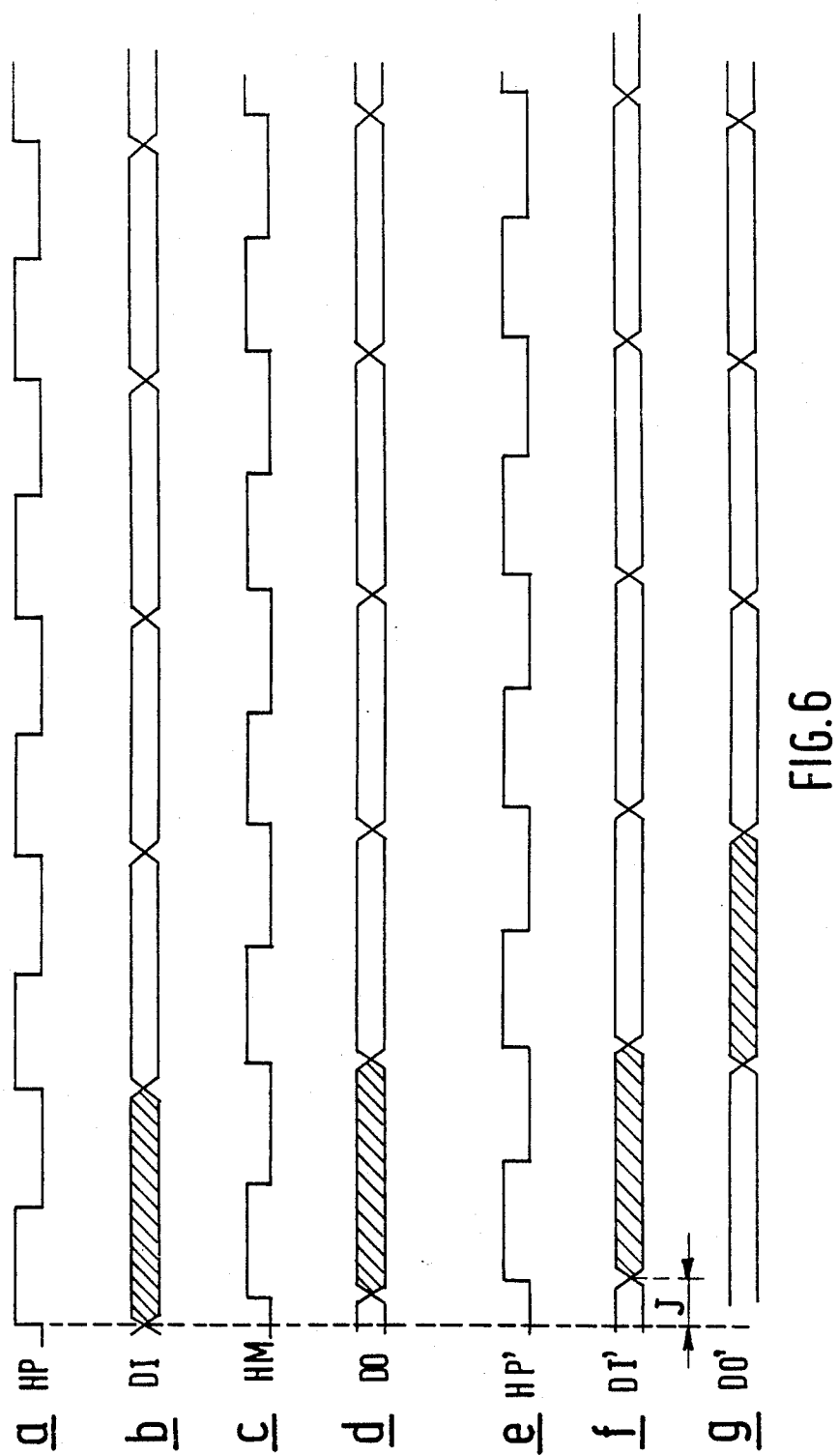
FIG. 6 shows a number of time diagrams illustrating an example of the shift which can occur in a transmission system when the method according to the invention is not utilized.

In FIG. 6 is shown a number of time diagrams illustrating an example of the shift which can occur in a transmission system when the method according to the invention is not utilized.

The initial delay adjustment is effected at the central station with a precision of 1-bit period, and when passing through a relay sub-station, the reception of a packet is effected with the clock recovered from the received packet, thus the clock coming from the immediately preceding station. On the other hand, the transmission of this packet to the central station is effected with the clock of the relay sub-station which is that of the multiplex signal coming from the central station. These two clocks have the same frequency but their phases may differ, in fact the phase shift depends on the distance between the relay sub-station and the immediately preceding station. In addition, these two clocks can be affected by mutual jitter and, according to their phase, a slight jitter can mean a shift of one bit period when passing through the relay sub-station. This phenomenon is shown in FIG. 6.

At line a is indicated the clock HP that is extracted from the received data packet at a given instant, and line b symbolically represents the data DI of the received packet. The clock HM of the relay sub-station that is extracted from the multiplex signal transmitted by the central station is represented at line c, and with this clock HM the data DO are retransmitted to the central station. If at another instant a slight shift occurs, a shift shown by way of line e representing the clock HP′ that is extracted from the received data packet and by line f symbolically representing the data DI′ of the received packet, the data DO′ and then retransmitted (always in accordance with the clock HM) with a shift of 1 bit period as indicated by line g. The jitter J mutually affecting the clocks HP and HM is represented at line f.

Thus, when a plurality of relay sub-stations are inserted in cascade between a terminal sub-station and a central station, it may happen that, taking account of the distances between the relay sub-stations, the packet receive clock and the packet transmit clock of several of these relay sub-stations are practically in phase. If, for any reason, for example a temperature variation, there occurs a shift between the clocks, this fact can translate into a sudden shift over several bits periods on reception of the data at the central station thus provoking an overlapping of data packets.

In order to avoid this phenomenon, it is necessary to effect a more precise adjustment of the delay of the sub-stations, so as to let a slight jitter no longer cause a shift over 1 bit period upon passing through the relay sub-station.

Figure 7:
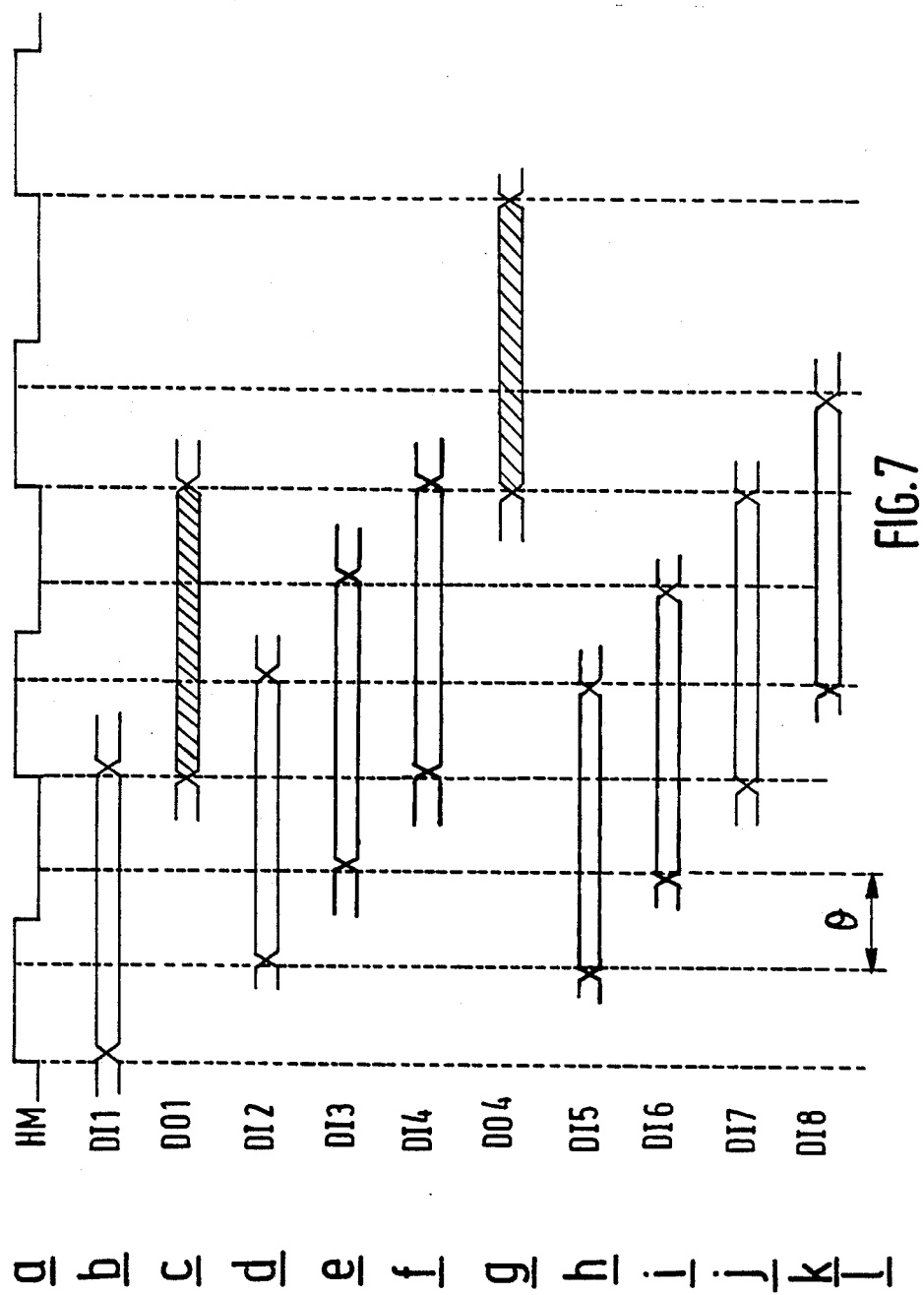
FIG. 7 shows a number of time diagrams illustrating how a shift can be avoided when the method according to the invention is utilized.

FIG. 7 shows how such a shift can be avoided when the method according to the invention is applied. The adjusting mode used, adjustment to ⅓-bit period allows delay variations of ±⅓-bit period without a data shift.

At line a is represented the clock HM that is used to retransmit the received data. FIG. 7 considers the extreme cases in which the received data are slightly advanced or slightly delayed with respect to the clock HM.

Line b represents data DI1 that are slightly delayed with respect to the clock HM. The retransmission of these data DO1 is represented at line c, this transmission time (to a precision of 1 bit period) is considered to be exact for the central station. If the delay of the data of line b is increased by ⅓-bit period (DI2, line d) or ⅔-bit period (DI3, line e), the retransmission will always be effected in conformity with line c, invariably considered to be correct for the central station. On the other hand, if the delay of the data of line b is increased by 1 bit period (DI4, line f) the retransmission of these data DO4 (line g) will be effected with a jump of 1-bit period. The adjustment then consists in diminishing the delay by ⅔-bit period, which imposes on the received data a position which is identical to the one occupied by the data of line d. Such an adjustment thus permits a shift of ⅓-bit period to the left and nearly ⅔-bit period to the right without provoking an inopportune jump.

Line h represents data DI5 that are advanced with respect to the clock HM, these data being shifted by nearly ⅓-bit period with respect to those of line b. If the delay of these data is increased by ⅓-bit period (DI6, line i) or ⅔-bit period (DI7, line j), the retransmission will be effected in a correct manner that is identical with line c, the data shown on line j still being slightly advanced relative to the local clock HM. If the delay is again increased by ⅓-bit period (DI8, line k), the retransmission of the data will be effected with a jump of 1-bit period in a manner identical to that of line g. The adjustment must also be effected by diminishing the delay by ⅔-bit period, which imposes on the received data a position which is identical to the one occupied by the data of line i. This adjustment thus permits a shift of ⅓-bit period to the right and nearly ⅔-bit period to the left without provoking an inopportune jump. On line 1 is shown the delay-adjusting range $\theta$ to be imposed on the data for an error-free retransmission thereof.

When proceeding in this manner, it will be clear that whatever phase the received data signal has with respect to the transmit clock HM, the time of arrival of the data signal can vary by ±⅓-bit period without provoking a shift of 1 bit period.

This adjustment mode is advantageously utilized for:

adjusting the delay of the first sub-station in the link from the central station: the received data arrive properly adjusted with respect to the clock of the central station; and adjusting the delay of the sub-stations situated further away: the data received in a relay sub-station arrive properly adjusted with respect to the clock of the relay sub-station. As the latter is properly adjusted with respect to the clock of the preceding station, the same holds for the retransmitted data.

Such a method of adjustment permits to avoid accidental jumps of 1 bit period upon passing through relay sub-stations as long as the jitter is less than ±⅓-bit period (for n=2). Generally it is possible to tolerate a jitter of $\pm(n-1)/(2n-1)$ bit period on the received data signal without producing a jump of 1 bit period.

What is claimed is:

1. A method of adjusting interstation delay in an information transmission system utilizing in one transmission direction the Time Division Multiple Access ("TDMA") method, the transmission system including a network comprising a central station and a plurality of sub-stations including relay sub-stations arranged in cascade, the sub-stations comprising time shifting means for shifting instants of transmitting information bits to the central station, the central station comprising time-detecting means for detecting an order in which said information bits arrive, each station in the network comprising at least a transmit time-base and a receive time-base, the method being characterized in that, the time-shifting and time-detecting means cooperate and in that the method is applied to the time-shifting and time-detecting means in order to adjust a delay to be allocated to the transmit time-bases in various sub-stations, the method comprising,
   a. at the central station, effecting the initial adjustment of the delay for each sub-station to a bit period and,
   b. at the sub-station,
      i. increasing the delay in steps of $1/(2n-1)$ bit period until a jump of 1 bit period is obtained, and then
      ii. decreasing the delay by n steps of the same size for optimum adjustment of the interstation delay, where n is an integer strictly greater than 1.

2. A method of adjusting the interstation delay as claimed in claim 1, comprising,
   for adjusting the delay of a terminal sub-station exchanging information with the central station through a cascade arrangement of relay sub-stations, sequentially applying the method in a predetermined order to said time-shifting means of the various sub-stations in the cascade arrangement cooperating with said time-detecting means of the central station, commencing in said order with the relay sub-station nearest to the central station, then the relay substation immediately following etc., and ending with the terminal sub-station.

3. An information transmission system utilizing the Time Division Multiple Access ("TDMA") method in one transmission direction, the system comprising a network comprising a central station and a plurality of substations including relay sub-stations arranged in cascade, the sub-stations comprising time-shifting means for shifting instants of transmitting information bits to the central station, the central station comprising time-detecting means for detecting an order in which said information bits arrive, each station in the network comprising at least a transmit time-base and a receive time-base, wherein the time-shifting means of the sub-stations are arranged to cooperate with the time-detecting means of the central station for adjusting the delay to be allocated to the transmit time-base with respect to the receive time-base of the respective sub-stations in order to perform the interstation delay adjusting method as claimed in claim 2.

4. A method of adjusting the interstation delay as claimed in claims 1 or 2, characterized in that it comprises the step of successively transmitting, on a data channel intended for the sub-station whose delay has to be adjusted, the following information signals:
   a telecontrol signal prohibiting all transmission from the sub-station in question;
   a telecontrol signal authorizing the sub-station in question to transmit only a reduced-size data packet in the time slot assigned thereto; and
   a telecontrol signal authorizing the sub-station in question to transmit in a normal manner.

5. An information transmission system utilizing the Time Division Multiple Access ("TDMA") method in one transmission direction, the system comprising a network comprising a central station and a plurality of substations including relay sub-stations arranged in cascade, the sub-stations comprising time-shifting means for shifting instants of transmitting information bits to the central station, the central station comprising time-detecting means for detecting an order in which said information bits arrive, each station in the network comprising at least a transmit time-base and a receive time-base, wherein the time-shifting means of the sub-stations are arranged to cooperate with the time-detecting means of the central station for adjusting the delay to be allocated to the transmit time-base with respect to the receive time-base of the respective sub-stations in order to perform the interstation delay adjusting method as claimed in claim 4.

6. An information transmission system utilizing the Time Division Multiple Access ("TDMA") method in one transmission direction, the system comprising a network comprising a central station and a plurality of substations including relay sub-stations arranged in cascade, the sub-stations comprising time-shifting means for shifting instants of transmitting information bits to the central station, the central station comprising time-detecting means for detecting an order in which said information bits arrive, each station in the network comprising at least a transmit time-base and a receive time-base, wherein the time-shifting means of the sub-stations are arranged to cooperate with the time-detecting means of the central station for adjusting the delay to be allocated to the transmit time-base with respect to the receive time-base of the respective sub-stations in order to perform the interstation delay adjusting method as claimed in claim 1.

* * * * *